United States Patent [19]
Knutson

[11] 3,757,823
[45] Sept. 11, 1973

[54] VALVE
[75] Inventor: Dale A. Knutson, Oconomowoc, Wis.
[73] Assignee: Applied Power Industries, Inc., Milwaukee, Wis.
[22] Filed: Nov. 2, 1971
[21] Appl. No.: 194,840

[52] U.S. Cl. ......................................... 137/625.64
[51] Int. Cl. ............................................. F16k 11/07
[58] Field of Search .............................. 137/625.64

[56] References Cited
UNITED STATES PATENTS
3,339,573  9/1967  Bahniuk ..................... 137/625.64 X
3,270,776  9/1966  Carls ............................ 137/625.64
2,852,948  9/1958  Renick ..................... 137/625.64 X Primary Examiner—Henry T. Klinksiek
Attorney—John J. Byrne

[57] ABSTRACT

A two stage servo operated valve comprising an open-center main valve and a pilot valve wherein separate hydraulic circuits are maintained for each of said valves.

6 Claims, 4 Drawing Figures

VALVE

This invention relates to a valve and, more particularly to a servo operated valve responsive to low force electrical or mechanical input signals.

The valve of this invention is controlled by input to a pilot valve, and is of the type used to directionally control flow from a pressure source to fluid motors, such as double-acting hydraulic cylinders, usually located at remote points. Valves of the type set forth herein are designed to operate under extremely high flows and pressures, but require a relatively low level of input force for actuation thereby permitting the use of relatively low force electro-magnetic input or low force mechanical input, such as in flexible cables. Low force input requirements permit the valve to be actuated by remotely positioned electrical, hydraulic or mechanical control means, which, in turn, allows the valve to be more closely positioned to the hydraulic fluid lines.

The valve of this invention is an improvement in a valve of the type disclosed in U.S. Pat. Nos. 3,311,858 for TORQUE MOTOR and 3,339,573 for FLOW CONTROL VALVE, both to Eugene Bahniuk. The valve disclosed therein, in a preferred embodiment comprises a two-stage hydraulic servo or proportional valve having a low-energy electro-mechanical input in the form of a torque motor for actuating a pilot valve. The pilot valve selectively communicates an expansible chamber at one end of the main spool valve to a separate pilot valve circuit system pressure or tank pressure to vary the pressure therein. An expansible chamber at the other end of the main valve is under static system pressure, whereby as the pressure is varied in the first-mentioned expansible chamber by means of selectively shifting the pilot valve, the pressure differential between the two chambers causes the main valve to shift thereby directing flow to and from the working chambers of a hydraulic piston or other working element. Displacement of the main spool is substantially proportional to the input signal to the pilot valve and is amplified with respect to the input signal.

It is an objective of this invention to provide an improvement in servo operated or proportional valves and, more particularly, an improvement in prior art valves of the type mentioned above wherein a low-force electrical input displaces the pilot valve, causing a proportional displacement in the main valve at a higher force level.

More particularly, it is an objective of this invention to provide a two-stage proportional or servo valve wherein the main valve is of the open-center type, meaning that when the valve is in the center or neutral position, the cylinder ports and the supply pressure will be communicated to the reservoir. By using an open center configuration, the output of the pump is bypassed to a reservoir at low pressure until the main valve is actuated. This eliminates the need for a pressure-compensated pump and results in a conservation of horsepower output of the prime mover during idle periods and eliminates wasted energy through heat loss since the hydraulic fluid need not overcome a bypass release valve as in the case of a pressure release system. The savings in horsepower is especially pronounced when a plurality of valves are connected in parallel thereby compounding the effective power loss during idle or no-work periods. However, it is imperative that a minimum pressure level by maintained in the pilot stage circuit generally on the level of 500 psi. Hence, in order to employ an open-center main valve, the main valve hydraulic circuit must be isolated from the pilot stage hydraulic circuit in order to maintain the desired pressure levels in the pilot stage circuit.

Therefore, it is a further objective of this invention to provide a two-stage proportional or servo valve having a completely isolated, low-flow, pilot valve fluid circuit requiring only a small fraction of the power generally necessary in a non open-center valve to maintain the pilot valve hydraulic circuit at 500 psi or more. This objective is realized by providing separate, non-connected main and pilot valve hydraulic circuits, and utilizing a separate, low-flow pump, to supply the pilot pressure. In this respect, the hydraulic power loss in the pilot stage is only a fraction of the power loss associated with maintaining 500 psi constantly on the main hydraulic circuit of non open-center valves of the prior art.

It is another objective of this invention to provide a valve which permits the use of a constant displacement pump as opposed to a variable displacement pump.

It is a further objective of this invention to provide a two-stage electro-hydraulic proportional valve having a manual override for actuating the pilot valve.

It is a further objective of the invention to provide a valve which is infinitely variable in response to a range of electrical inputs.

These and other objects of the invention will become more apparent to those skilled in the art by reference to the following detailed description when viewed in light of the accompanying drawings wherein.

Figure 1:
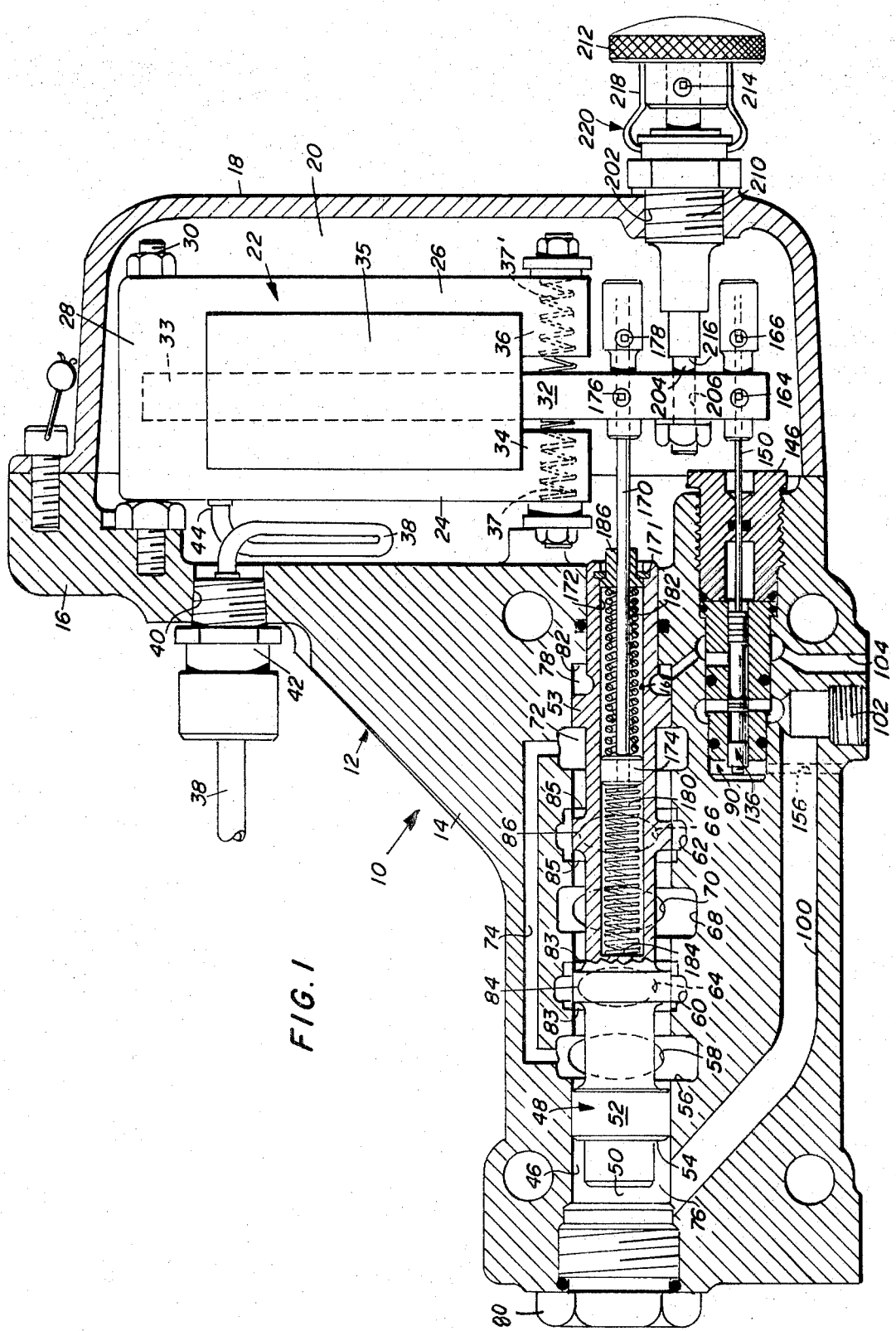
FIG. 1 is a cross-sectional view of the valve of this invention.

For purposes of illustration, the flow control proportional valve of this invention will be described in connection with an electrical torque motor, although it is to be understood that other input means known to those skilled in the art may be employed. In general, the present valve embodies a movable flow-control main valve which is actuated by a pilot valve. The displacement of the flow control valve is substantially proportional to an input signal to the pilot valve and is normally amplified with respect to the input signal. In the preferred form, an electrical torque motor displaced a movable pilot valve causing the main valve to be shifted hydraulically.

Referring now to the drawings wherein like numerals indicate like parts, the valve of this invention is generally indicated by the numeral 10 and includes a valve housing 12 comprised of a body portion 14 having an upstanding one end 16. A cover 18 is applied over the end 16 and defines a chamber 20 therewith, which chamber receives an electric torque motor 22 of the the type set forth in earlier referred to U.S. Pat. No. 3,311,858. The torque motor generally includes end plates 24 and 26 joined at their upper ends in spaced relationship by connecting member 28. The entire assembly is attached to the upstanding end wall 16 of the housing 12 by bolt and nut fastener means 30. An armature 32 is pivotally connected at its upper end in the area of the connector member 28 and extends downwardly through coil 34 and beyond the lower ends of the end plates 24 and 26 for connection to the actuator rods of the pilot and main valves as will be more fully explained below. The lower ends of the end plates are provided with pole pieces 34 and 36 of opposite polarity, the polarity being created by two permanent magnets, not shown, located on each side of coil 34. The pole pieces define an air gap therebetween and determine the limits of pivotal movement permitted to the armature when the coil 34 is energized. An electrical connection is made via conductor 38 which is connected at one end to a suitable electrical input control means, and extends through opening 40 in the end wall 16 of the housing 12 and is held therein by adjustable connecting grommet 42. The inner end 44 of the conductor 38 is attached to suitable conventional terminals on the torque motor 22. In accordance with the teachings of earlier mentioned U.S. Pat. No. 3,311,858, the armature is caused to pivot about pivot point 33 by polarizing the lower end of the armature causing it to be attracted to one or the other pole pieces 34 or 36 depending upon the direction of current flow in the coil 35. The attraction of the armature to the pole pieces is proportional to the amount of current in the coil, with centering springs 37 and 37' applying biasing forces to the armature such that as it moves toward one pole piece or the other, a greater force is required to overcome the spring biasing force as the armature nears a respective pole piece. Since the attraction to the pole piece is proportional to the amount of current in the coil, the amount of armature movement therefore is substantially linear to the amount of current supplied to the coil.

Referring now to the body portion 14 of the housing 12, the numeral 46 indicates a first bore which receives a main spool valve 48. The valve as shown is in the center or neutral position. Proceeding from left to right, the main spool valve 48 includes an end surface 50 and a land 52 snugly engaging the walls of the bore 46 spaced axially inwardly from the end surface 50. The land 52 provides a side wall surface 54 which provides a reaction surface along with end surface 50 for shifting the spool 48 hydraulically. The bore 46 on the other side of the land 52 opens into a first inlet groove 56 which communicates with a suitable pressure source throug inlet 58. Cylinder grooves 60 and 62 leading to the cylinder work chambers through cylinder ports 64 and 66 are axially spaced from the inlet grooves 56 and are separated from each other by return pressure groove 68 which communicates with port 70. A second groove 72 is provided on the far side of the cylinder groove 62 and is communicated to groove 56 by means of conduit 74.

It is to be understood that each of the above-mentioned grooves are separated by constant diameter portions of the walls of the bore 46.

Figure 4:
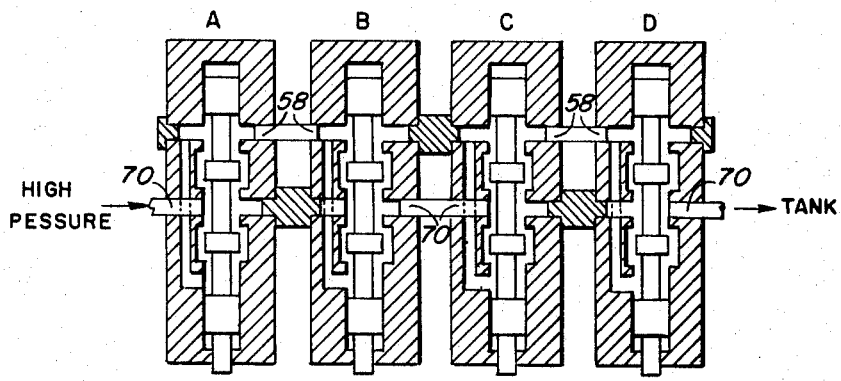
FIG. 4 is a diagrammatic illustration of a plurality of valves of this invention in a stacked arrangement.

It is to be further understood that the grooves 56 and 72 can be ported to either pressure or reservoir as can groove 68. In other words, in the description of the embodiment of FIG. 1 above, the grooves 56 and 72 are ported to pressure and the grooves 68 are ported to reservoir. The valve of this invention, however, is capable of being placed in a stacked arrangement as diagrammatically illustrated in FIG. 4. In the stacked arrangement the pressure and return ports for each valve A-D are "flip-flopped" from the valve immediately upstream. High pressure is introduced to valve A through groove 70 but leaves via groove 56. While in valve B the fluid under pressure enters through groove 56 but exits via grooves 70 and so on.

The spool lands 52, 53 snugly but slidingly engage the inner walls of the bore 46, and with plug 80 and end wall 82, define motor chambers 76 and 78 respectively. Lands 84 and 86 are normally disposed in centered relationship with respect to the axial lengths of the cylinder grooves 60 and 62 when the valve is in the centered or null and balanced position as shown in the drawing. The lands 84 and 86 are provided with notches 83 and 85 respectively which permit free flow between the various ports and around the lands 84 and 86 when the spool is centered. In this position, the fluid from port 58 and groove 56 as well as the hydraulic fluid from the cylinder ports 64 and 66 are dumped to the reservoir through the notches 83 and 85 and groove 68. This is what is termed an open-center valve and the advantages, especially with respect to savings of horsepower on the prime mover, and the cost of a pressure compensated pump over a fixed displacement pump have been fully emphasized earlier herein.

Figure 2:
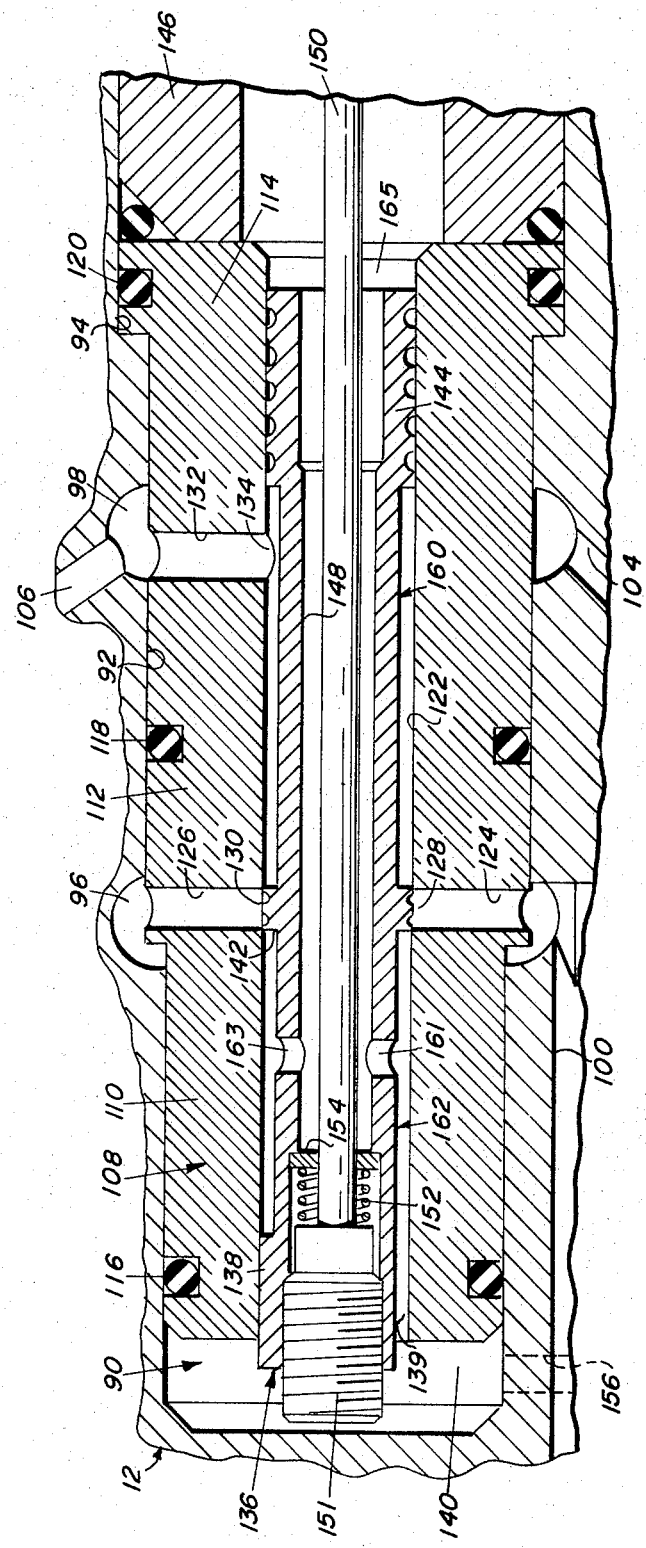
FIG. 2 is an enlarged cross-sectional view of the pilot valve stage.

Referring to FIG. 2, the pilot valve stage of the valve of this invention comprises a bore generally indicated by the numeral 90 having enlarged diameter portions 92 and 94. Spaced axially along the length of the enlarged diameter portion 92 are annular grooves 96 and 98. Groove 96 is communicated to motor chamber hereinafter referred as "control chamber" 76 via passageway 100. Closure 102 seals a production bore adjacent groove 96. Groove 98 communicates pressure port 104 to motor chamber 78 via passageway 106. The pilot stage and the main valve stage operate within completely separate hydraulic circuits with the pumping force required to maintain the isolated pilot stage at a preferred p.s.i. level being much lower than that required if both were within the same circuit. A sleeve 108 is received in the bore 90 and includes step portions 110, 112 and 114 to coincide with the various enlarged diameter portions of the bore 90 such that the sleeve is tightly and snuggly received within the bore. A chamber 140 is defined by the closed end of bore 90 and the inner end of sleeve 108. Conventional sealing rings 116, 118 and 120 are provided to prevent fluid leakage between the exterior walls of the sleeve 108 and the wall of the bore 90 at axially spaced locations and, in particular, on either side of the grooves 96 and 98. The sleeve is provided with an axial bore 122 and has radial passageways 124 and 126 which communicate the groove 96 to the bore 122 through orifices 128 and 130. Radial passageway 132 communicates annular groove 98 to bore 122 through orifice 134. A spool 136 is slidably received within the bore 122 and includes a guide 138 which is triangular in cross-section thereby defining passageways, one of which 139 is shown, communicating the chamber 140 with the chamber 162. The guide 138 snugly but slidably engages the inner surface of bore 122 along three peripherally spaced lines. The second or control land 142 normally blocks orifices 128 and 130, while a third land 144 seals the other end of the bore 122. As shown in FIG. 1, a threaded plug 146 closes the end of the bore 90 communicating with the chamber 20 and firmly abuts the sleeve 108 to hold it in the position shown. The pilot valve has a longitudinal bore 148 extending the length thereof for receiving an actuator rod 150.

The actuator rod abuts an externally threaded lug 151 which threadedly engages the inner surface of the bore 148 of the pilot valve. By turning lug 151, the biasing force of spring 152, which abuts the lug 151 on one end and a retaining ring 154 on the other can be adjusted. A passageway 156 communicates chamber 140 to return pressure, which in turn is communicated to chamber 162 via passageway 139. Hence, when the valve is in the centered or null and balanced position, the annular chamber 160 defined by lands 142 and 144 is under static system pressure, and annular chamber 162, defined by lands 138 and 142, is under return or reservoir pressure. Further axial passageways 161 and 163 communicate return pressure to bore 148 and the area 165 at the end of sleeve 108 and adjacent plug 146.

The actuator rod 150 of the pilot valve is attached to the lower end of the armature 32 by means of set screws 164 and 166. A force feed-back means substantially identical to that disclosed in the earlier mentioned U.S. Pat. No. 3,339,573, is generally indicated by the numeral 168. More particularly, the force feed-back means includes a feed-back rod 170, which extends inwardly of the main valve 48 through internal bore 172 and has a piston or button 174 attached to the inner end of the rod 170 in a position approximately mid-way the length of the bore 172. The other end of the rod is attached to armature 32 by means of set screws 176 and 178. A pair of coil springs 180 and 182 are positioned within the bore, with one on each side of the piston 74. Thus, spring 180 is arranged to abut the end wall 184 at the end of the bore 170 and at the other end on the piston 174, while the other spring 182 abuts at one end on the piston 174 and at the other end on the aperture plug 186, secured in place at the outer end of the bore 170 by suitable means such as snap ring 171.

In the operation of the valve the input signal is applied to the armature 32 by means of the electric coil 34. The movement of the armature 32 is then applied through the rod 150 to the pilot valve spool 136 to shift the position of the land 142 relative to the orifices 128 and 130 of passageways 124 and 126. As mentioned earlier, the annular chamber 160 is always under pilot stage pressure and annular chamber 162 on the opposite side of the land 142 is always under return or reservoir pressure. It is to be understood that the pressure in the motor chamber 78 is equal to the pressure in the annular groove 122. The pilot valve's spool land 142 has an axial length slightly less than that of the orifices 129 and 130, on the order of about 0.003 inch, so that when the land is centered the orifices are partially open to communication with either return pressure or supply pressure. In this position, the main spool 48 will stay in a balanced position since the pressure in chamber 78 will be approximately one-half system pressure. It is to be understood, at this time, that the working or reaction surface area A1 facing pressure chamber 78 is approximately half that of the total area of the reaction surfaces 50 and 54 facing the control chamber 76. Therefore, depending upon the direction of movement of armature 32 and consequently the direction of movement of the land 148, the orifices 128 and 130 are opened either to return pressure or to system pressure, meaning that the control chamber 76 is also open to return pressure or system pressure. A differential pressure results between chamber 76 and chamber 78 causing the main valve 48 to shift accordingly.

More particularly, when the armature is shifted to the right against pole piece 36, the pilot valve spool is also shifted to the right thereby uncovering orifices 128 and 130 and exposing the passageways 124 and 126 and groove 96 to return pressure. Since the control chamber 76 is communicated to the annular groove 96 and radial passageways 124 and 126 via passageway 100, the pressure in the chamber 76 will be lowered accordingly resulting in a differential pressure causing the main valve 48 to shift to the left. When the armature is shifted to the left against pole piece 34, the pilot valve spool also moves to the left thereby uncovering the orifices 128 and 130 and communicating the system pressure to passageways 124 and 126 and eventually to control chamber 76 raising the pressure therein. The differential pressure between the chamber 78 and 76 will be such as to cause the main spool valve 48 to move to the right.

It is to be understood that when the main valve is in the position shown, there is virtually no load on the prime mover in that the fluid output of the pump is communicated directly to return pressure as set forth earlier herein. When the main valve moves to the right, for example, lands 84 and 86 will seal the area between the grooves 60 and 68 and 62 and 72 respectively, thereby communicating cylinder port 64 to port 58, and cylinder port 66 to port 70.

The purpose of the feed-back means is to interconnect the axial position of the main spool valve 48 to the command position determined by the forces applied to the motor armature 32. This feed-back is accomplished by means of the rod 170 which provides a biasing force on the armature 32 proportional to the displacement of the main valve spool 48 from the centered position. For example, if the valve spool 48 is moved to the left from the position shown in FIG. 1, the aperture plug 186 will force the spring 182 against the piston 174, so that movement of the main valve 48 toward the left will provide an increasing biasing force tending to force the armature 32 toward the left. Since in accordance with the previous description of the operation of the valve, this movement of the main spool to the left is accomplished by movement of the pilot valve spool to the right, as caused by the movement of the lower end of the armature 32 to the right, the feed-back force through the rod 170 will be in a counterbalancing direction tending to shift the armature 32 and hence, the pilot valve spool beck to the center position. The input to the armature 32 is in the form of a force or torque tending to move the armature toward the right, therefore, this position will be maintained only until the main valve spool 48 has moved a sufficient distance to provide a counter-balancing force on the armature 32 necessary to move it back to the centered position. Since this feed-back force through the rod to 170 is proportional to the displacement of the main valve spool 148, and since the input signal can be a variable force applied to the armature 32, it can be seen that it bears a linear relationship between them, and the greater the force applied to the armature 32, the farther the spool 48 will move to return the system to equilibrium, and thereby the greater the flow will be from the pressure inlet port to the selected cylinder port. Thus, the valves serve as a stable, proportioning valve adapted to precisely control the rate and direction of fluid flows to and from one or the other of a set of cylinder ports.

A manual override, generally indicated by the numeral 220, extends through an opening 202 in the cover 18 and includes a rod 204 which is loosely connected to armature 32 through an opening 206 therein. The rod has an abutment 208 on its free end on the opposite side of armature 32 and is slidably received in a bushing 210 threadedly engaged in opening 202. A knob 212 attached to the outer end thereof by means of a set screw 214 or the like. The rod 204 has a shoulder 216 thereon spaced from the armature 32. The space between the shoulder 216 and the abutment 208 is sufficient to permit the armature to move freely between the pole piece 34 and 36 during normal operation. The outer end of the rod is provided with a flexible boot 218. A spring centering device, not shown, is interior of the bushing 210 and serves to normally maintain the rod in the center position as shown. It is apparent that the pilot valve can be operated manually by pushing or pulling on rod 204 by means of know 212 such that shoulder 216 pushes armature 32 to the left, or the armature can be pulled to the right by engagement with abutment 208.

In summary, the valve of this invention provides separate hydraulic circuits for the main valve stage and the pilot valve stage thereby permitting the use of an open-center main valve. In this respect, substantial savings in energy and in cost, because of the use of a fixed displacement pump, can be realized during idle or no-work periods. The separate hydraulic circuit for the pilot stage requires a much lower output to maintain the pressure in the valve stage at the necessary level.

Figure 3:
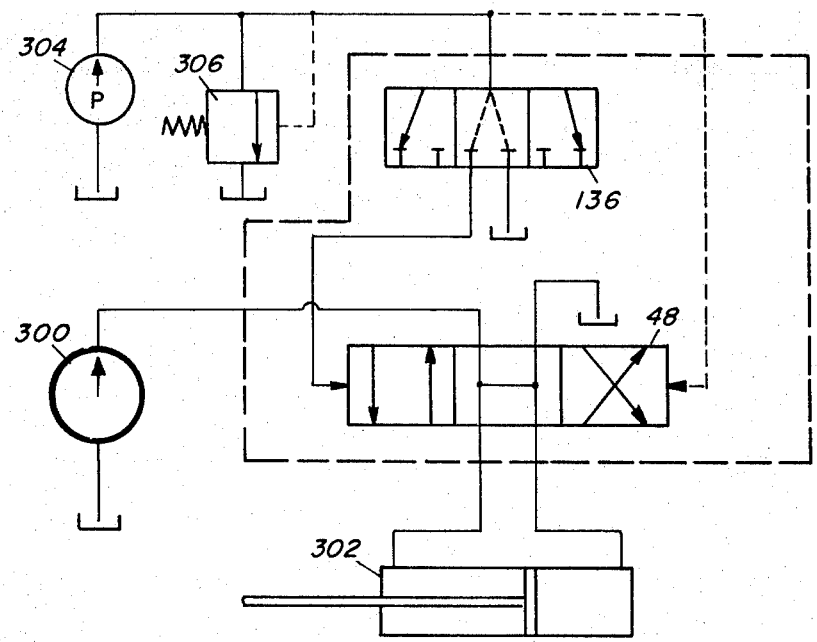
FIG. 3 is a diagrammatic illustration of the hydraulic circuits of the valve of this invention.

This is more clearly understood with reference to the diagrammatic illustration of FIG. 3. A main valve stage pump 300 communicates with modulating main valve 48 which is interposed between the pump 300 and a cylinder 302. The pilot stage includes a pilot stage pump of a much lower horsepower than that of the main stage pump. If desired, a pressure release valve 306 may be employed in the pump output line of the pilot stage.

In general manner, while there has been disclosed an effective and efficient embodiment of the invention, it should be well understood that the invention is not limited to such an embodiment as there might be changes made in the arrangement, disposition, and form of the parts without departing from the principle of the present invention as comprehended within the scope of the accompanying claims.

I claim:

1. A valve comprising a housing, a first bore, an open center main valve reciprocably received in said first bore, a second bore in said housing, a pilot valve reciprocably received in said second bore, a first fluid circuit comprising first inlet and outlet means communicating said first bore with first fluid pressure source means and a reservoir respectively, cylinder inlet-outlet ports in said first bore, a second fluid circuit comprising second inlet and outlet means communicating said second bore with a second fluid pressure source and reservoir respectively, a motor chamber at each end of said main valve, first passageway means communicating said second fluid pressure source to one of said chambers, and second passageway means communicating said other chamber to said second bore, said pilot valve extending across said second passageway means, actuating means for shifting said pilot valve to selectively communicate said other chamber to said second fluid pressure source or said second reservoir through said second passageway means, whereby a fluid pressure differential between said chambers causes said main valve to shift, said actuating means responsive to at least one of a plurality of input signals, first connecting means between said actuating means and said pilot valve, second connecting means interconnecting said actuating means and said main valve, whereby movement of said actuating means in response to an input signal moves said pilot valve to determine a movement of said main valve producing a force tending to shift actuating means in opposition to said input signal.

2. The valve of claim 1 wherein the pressure level of said second fluid pressure source is lower than that of said first fluid pressure source.

3. The valve of claim 1 wherein said main valve is a spool valve.

4. The valve of claim 1 wherein said actuating means is an electric torque motor.

5. The valve of claim 4 and including a manual override means for actuating said pilot valve.

6. A valve comprising a housing, a first bore, an open center main valve reciprocably received in said first bore, a second bore in said housing, a pilot valve reciprocably received in said second bore, a first fluid circuit comprising first inlet and outlet means communicating said first bore with first fluid pressure source means and a reservoir respectively, cylinder inlet-outlet ports in said first bore, a second fluid circuit comprising second inlet and outlet means communicating said second bore with a second fluid pressure source and reservoir respectively, a motor chamber at each end of said main valve, first passageway means communicating said second fluid pressure source to one of said chambers, and second passageway means communicating said other chamber to said second bore, said pilot valve extending across said second passageway means, actuating means for shifting said pilot valve to selectively communicate said other chamber to said second fluid pressure source or said second reservoir through said second passageway means, whereby a fluid pressure differential between said chambers causes said main valve to shift, said actuating means comprising a torque motor means having a pivoted armature supported with respect to the valve housing, first connecting means directly connecting said armature to said pilot valve, second connecting means having a lost-motion action connecting said armature to said main valve, electrical actuating means to impress an electrical signal upon the torque motor means and non-electrical actuating means connected to said armature, whereby displacement of the armature from a neutral position of zero torque by a net torque exerted on the armature by one or more of said electrical actuating means initiates through movement of said pilot valve a responsive movement of said main valve restoring the armature to a neutral position, thereby affecting the direction and magnitude of flow through said inlet-outlet ports.

\* \* \* \* \*

UNITED STATES PATENT OFFICE
CERTIFICATE OF CORRECTION

Patent No. 3,757,823          Dated September 11, 1973

Inventor(s) Dale A. Knutson

It is certified that error appears in the above-identified patent and that said Letters Patent are hereby corrected as shown below:

Following Claim 6, column 8, line 62, the following claims should be added:

--7. A valve comprising a housing, a first chamber, a main valve reciprocably received in said first chamber, a second chamber in said housing, a pilot valve received in said second chamber, a first fluid circuit comprising first inlet and outlet means communicating said first chamber with first fluid pressure source means and a reservoir respectively, inlet-outlet ports in said first chamber, a second fluid circuit comprising second inlet and outlet means communicating said second chamber with a second fluid pressure source and reservoir respectively, a motor chamber at each end of said main valve, first passageway means communicating said second fluid pressure source to said motor chambers, and second passageway means communicating at least one of said motor chambers to said second reservoir, said pilot valve extending across said first and second passageway means, actuating means for shifting said pilot valve, said

UNITED STATES PATENT OFFICE
CERTIFICATE OF CORRECTION

Patent No. 3,757,823               Dated September 11, 1973

Inventor(s) Dale A. Knutson

It is certified that error appears in the above-identified patent and that said Letters Patent are hereby corrected as shown below:

continued - - actuating means being responsive to at least one of a plurality of input signals connecting means between said actuating means and said pilot valve whereby movement of said actuating means in response to an input signal moves said pilot valve, said movement of said pilot valve selectively communicates at least one of said motor chambers to said second fluid pressure source or said second reservoir through said first and second passageways creating a pressure differential between said motor chamber means, thereby causing a displacement of said main valve substantially proportional to the input signal.

UNITED STATES PATENT OFFICE
CERTIFICATE OF CORRECTION

Patent No. 3,757,823    Dated September 11, 1973

Inventor(s) Dale A. Knutson

It is certified that error appears in the above-identified patent and that said Letters Patent are hereby corrected as shown below:

8. The valve of Claim 7 and including feedback means responsive to movement of said main valve to produce a force tending to shift said actuating means in opposition to said input signal.

9. The valve of Claim 7 wherein said main valve is an open-centered valve.--

Signed and sealed this 11th day of February 1975.

(SEAL)
Attest:

RUTH C. MASON
Attesting Officer

C. MARSHALL DANN
Commissioner of Patents
and Trademarks